(12) United States Patent
Ananthapadmanabha et al.

(10) Patent No.: US 9,450,870 B2
(45) Date of Patent: Sep. 20, 2016

(54) SYSTEM AND METHOD FOR FLOW MANAGEMENT IN SOFTWARE-DEFINED NETWORKS

(71) Applicant: BROCADE COMMUNICATIONS SYSTEMS, INC., San Jose, CA (US)

(72) Inventors: Kashyap Tavarekere Ananthapadmanabha, San Jose, CA (US); Vivek Agarwal, San Jose, CA (US); Eswara S. P. Chinthalapati, San Jose, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 203 days.

(21) Appl. No.: 13/669,313

(22) Filed: Nov. 5, 2012

(65) Prior Publication Data

US 2013/0124707 A1    May 16, 2013

Related U.S. Application Data

(60) Provisional application No. 61/558,332, filed on Nov. 10, 2011.

(51) Int. Cl.
| | |
|---|---|
| *G06F 15/173* | (2006.01) |
| *H04L 12/743* | (2013.01) |
| *H04L 12/701* | (2013.01) |
| *H04L 12/851* | (2013.01) |

(Continued)

(52) U.S. Cl.
CPC ........... *H04L 45/7457* (2013.01); *H04L 45/00* (2013.01); *H04L 47/2441* (2013.01); *H04L 49/3009* (2013.01); *H04L 61/103* (2013.01)

(58) Field of Classification Search
CPC ... H04L 45/38; H04L 47/2441; H04L 45/00; H04L 61/103
USPC ........................................................ 709/223
See application file for complete search history.

(56) References Cited

U.S. PATENT DOCUMENTS

| | | |
|---|---|---|
| 5,390,173 A | 2/1995 | Spinney |
| 5,802,278 A | 9/1998 | Isfeld |

(Continued)

FOREIGN PATENT DOCUMENTS

| | | |
|---|---|---|
| CN | 102801599 A | 11/2012 |
| EP | 0579567 | 5/1993 |

(Continued)

OTHER PUBLICATIONS

Tanyingyong, Voravit et al., "Using Hardware Classification to Improve PC-Based OpenFlow Switching", 2011 IEEE 12th International Conference on High Performance Switching and Routing, pp. 215-221.

(Continued)

*Primary Examiner* — Yves Dalencourt
(74) *Attorney, Agent, or Firm* — Shun Yao; Park, Vaughan, Fleming & Dowler LLP

(57) ABSTRACT

A system facilitates flow definition management in a switch. During operation, the system identifies a generic flow definition which specifies a flow that is not specific to any input port of a switch. The system further stores in a flow lookup data structure one or more port-specific flow rules based on the generic flow definition, wherein each port-specific flow rule corresponds to a respective port capable of processing data flows.

20 Claims, 9 Drawing Sheets

(51) Int. Cl.
*H04L 29/12* (2006.01)
*H04L 12/935* (2013.01)

(56) References Cited

U.S. PATENT DOCUMENTS

| | | |
|---|---|---|
| 5,878,232 A | 3/1999 | Marimuthu |
| 5,959,968 A | 9/1999 | Chin |
| 5,973,278 A | 10/1999 | Wehrill, III |
| 5,983,278 A | 11/1999 | Chong |
| 6,041,042 A | 3/2000 | Bussiere |
| 6,085,238 A | 7/2000 | Yuasa |
| 6,104,696 A | 8/2000 | Kadambi |
| 6,185,214 B1 | 2/2001 | Schwartz |
| 6,185,241 B1 | 2/2001 | Sun |
| 6,438,106 B1 | 8/2002 | Pillar |
| 6,498,781 B1 | 12/2002 | Bass |
| 6,542,266 B1 | 4/2003 | Phillips |
| 6,633,761 B1 | 10/2003 | Singhal |
| 6,771,610 B1 | 8/2004 | Seaman |
| 6,873,602 B1 | 3/2005 | Ambe |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser |
| 7,571,447 B2 | 8/2009 | Ally |
| 7,599,901 B2 | 10/2009 | Mital |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,924,837 B1 | 4/2011 | Shabtay |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake |
| 8,369,335 B2 | 2/2013 | Jha |
| 8,369,347 B2 | 2/2013 | Xiong |
| 8,392,496 B2 | 3/2013 | Linden |
| 8,462,774 B2 | 6/2013 | Page |
| 8,467,375 B2 | 6/2013 | Blair |
| 8,520,595 B2 | 8/2013 | Yadav |
| 8,599,850 B2 | 12/2013 | Jha |
| 8,599,864 B2 | 12/2013 | Chung |
| 8,615,008 B2 | 12/2013 | Natarajan |
| 8,706,905 B1 | 4/2014 | McGlaughlin |
| 8,724,456 B1 | 5/2014 | Hong |
| 8,806,031 B1 | 8/2014 | Kondur |
| 8,826,385 B2 | 9/2014 | Congdon |
| 8,830,841 B1* | 9/2014 | Mizrahi et al. ............ 370/241.1 |
| 8,937,865 B1 | 1/2015 | Kumar |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0039350 A1 | 4/2002 | Wang |
| 2002/0054593 A1 | 5/2002 | Morohashi |
| 2002/0091795 A1 | 7/2002 | Yip |
| 2003/0041085 A1 | 2/2003 | Sato |
| 2003/0123393 A1 | 7/2003 | Feuerstraeter |
| 2003/0174706 A1 | 9/2003 | Shankar |
| 2003/0189905 A1 | 10/2003 | Lee |
| 2003/0216143 A1 | 11/2003 | Roese |
| 2004/0001433 A1 | 1/2004 | Gram |
| 2004/0003094 A1 | 1/2004 | See |
| 2004/0010600 A1 | 1/2004 | Baldwin |
| 2004/0049699 A1 | 3/2004 | Griffith |
| 2004/0057430 A1 | 3/2004 | Paavolainen |
| 2004/0117508 A1 | 6/2004 | Shimizu |
| 2004/0120326 A1 | 6/2004 | Yoon |
| 2004/0153570 A1* | 8/2004 | Shobatake .................. 709/238 |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0213232 A1 | 10/2004 | Regan |
| 2005/0007951 A1 | 1/2005 | Lapuh |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0122979 A1 | 6/2005 | Gross |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima |
| 2006/0034292 A1 | 2/2006 | Wakayama |
| 2006/0059163 A1 | 3/2006 | Frattura |

(56) References Cited

U.S. PATENT DOCUMENTS

| | | |
|---|---|---|
| 2006/0062187 A1 | 3/2006 | Rune |
| 2006/0072550 A1 | 4/2006 | Davis |
| 2006/0083254 A1 | 4/2006 | Ge |
| 2006/0093254 A1 | 5/2006 | Mozdy |
| 2006/0098589 A1 | 5/2006 | Kreeger |
| 2006/0140130 A1 | 6/2006 | Kalkunte |
| 2006/0168109 A1 | 7/2006 | Warmenhoven |
| 2006/0184937 A1 | 8/2006 | Abels |
| 2006/0221960 A1 | 10/2006 | Borgione |
| 2006/0235995 A1 | 10/2006 | Bhatia |
| 2006/0242311 A1 | 10/2006 | Mai |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2007/0036178 A1 | 2/2007 | Hares |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0211712 A1 | 9/2007 | Fitch |
| 2007/0258449 A1 | 11/2007 | Bennett |
| 2007/0274234 A1 | 11/2007 | Kubota |
| 2007/0289017 A1 | 12/2007 | Copeland, III |
| 2008/0052487 A1 | 2/2008 | Akahane |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112400 A1 | 5/2008 | Dunbar et al. |
| 2008/0133760 A1 | 6/2008 | Berkvens |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285458 A1 | 11/2008 | Lysne |
| 2008/0285555 A1 | 11/2008 | Ogasahara |
| 2008/0298248 A1 | 12/2008 | Roeck |
| 2008/0304498 A1 | 12/2008 | Jorgensen |
| 2008/0310342 A1 | 12/2008 | Kruys |
| 2009/0022069 A1 | 1/2009 | Khan |
| 2009/0037607 A1 | 2/2009 | Farinacci |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0106405 A1 | 4/2009 | Mazarick |
| 2009/0116381 A1 | 5/2009 | Kanda |
| 2009/0129384 A1 | 5/2009 | Regan |
| 2009/0138577 A1 | 5/2009 | Casado |
| 2009/0138752 A1 | 5/2009 | Graham |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0232031 A1 | 9/2009 | Vasseur |
| 2009/0245137 A1 | 10/2009 | Hares |
| 2009/0245242 A1 | 10/2009 | Carlson |
| 2009/0246137 A1 | 10/2009 | Hadida Ruah et al. |
| 2009/0252049 A1 | 10/2009 | Ludwig |
| 2009/0252061 A1 | 10/2009 | Small |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323708 A1 | 12/2009 | Ihle |
| 2009/0327392 A1 | 12/2009 | Tripathi |
| 2009/0327462 A1 | 12/2009 | Adams |
| 2010/0027420 A1 | 2/2010 | Smith |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0257263 A1 | 10/2010 | Casado |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0287262 A1 | 11/2010 | Elzur |
| 2010/0287548 A1 | 11/2010 | Zhou |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0055274 A1 | 3/2011 | Scales et al. |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085563 A1 | 4/2011 | Kotha |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | VanDerMerwe |
| 2011/0142062 A1 | 6/2011 | Wang |
| 2011/0161494 A1 | 6/2011 | McDysan |
| 2011/0161695 A1 | 6/2011 | Okita |
| 2011/0188373 A1* | 8/2011 | Saito ............... 370/230 |
| 2011/0194403 A1 | 8/2011 | Sajassi |
| 2011/0194563 A1 | 8/2011 | Shen |
| 2011/0228780 A1 | 9/2011 | Ashwood-Smith |

(56) References Cited

U.S. PATENT DOCUMENTS

| | | |
|---|---|---|
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0274114 A1 | 11/2011 | Dhar |
| 2011/0280572 A1 | 11/2011 | Vobbilisetty |
| 2011/0286457 A1 | 11/2011 | Ee |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob Da Silva et al. |
| 2012/0033669 A1 | 2/2012 | Mohandas |
| 2012/0075991 A1 | 3/2012 | Sugita |
| 2012/0099567 A1 | 4/2012 | Hart |
| 2012/0099602 A1 | 4/2012 | Nagapudi |
| 2012/0106339 A1 | 5/2012 | Mishra |
| 2012/0131097 A1 | 5/2012 | Baykal |
| 2012/0131289 A1 | 5/2012 | Taguchi |
| 2012/0147740 A1 | 6/2012 | Nakash |
| 2012/0158997 A1 | 6/2012 | Hsu |
| 2012/0163164 A1 | 6/2012 | Terry |
| 2012/0177039 A1 | 7/2012 | Berman |
| 2012/0243539 A1 | 9/2012 | Keesara |
| 2012/0275347 A1 | 11/2012 | Banerjee |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0067466 A1 | 3/2013 | Combs |
| 2013/0070762 A1 | 3/2013 | Adams |
| 2013/0114595 A1 | 5/2013 | Mack-Crane et al. |
| 2013/0127848 A1 | 5/2013 | Joshi |
| 2013/0194914 A1 | 8/2013 | Agarwal |
| 2013/0219473 A1 | 8/2013 | Schaefer |
| 2013/0230047 A1* | 9/2013 | Subrahmaniam et al. ... 370/392 |
| 2013/0250951 A1 | 9/2013 | Koganti |
| 2013/0259037 A1 | 10/2013 | Natarajan |
| 2013/0272135 A1 | 10/2013 | Leong |
| 2013/0301642 A1 | 11/2013 | Radhakrishnan |
| 2014/0044126 A1 | 2/2014 | Sabhanatarajan |
| 2014/0105034 A1 | 4/2014 | Sun |

FOREIGN PATENT DOCUMENTS

| | | |
|---|---|---|
| EP | 1398920 A2 | 3/2004 |
| EP | 1916807 A2 | 4/2008 |
| EP | 2001167 A1 | 10/2008 |
| WO | 2008056838 | 5/2008 |
| WO | 2009042919 | 4/2009 |
| WO | 2010111142 A1 | 9/2010 |
| WO | 2014031781 | 2/2014 |

OTHER PUBLICATIONS

Naous, Jad et al., "Implementing an OpenFlow Switch on the NetFPGA platform", Nov. 2008.

Mogul, Jeffrey C. et al., "DevoFlow: Cost-Effective Flow Management for High Performance Enterprise Networks", Oct. 2010.

Yu, Minian et al., "Scalable Flow-Based Networking with DIFANE", Sep. 2010.

Eastlake, D. et al., 'RBridges: TRILL Header Options', Dec. 24, 2009, pp. 1-17, TRILL Working Group.

Perlman, Radia et al., 'RBridge VLAN Mapping', TRILL Working Group, Dec. 4, 2009, pp. 1-12.

Touch, J. et al., 'Transparent Interconnection of Lots of Links (TRILL): Problem and Applicability Statement', May 2009, Network Working Group, pp. 1-17.

Switched Virtual Networks. 'Internetworking Moves Beyond Bridges and Routers' Data Communications, McGraw Hill. New York, US, vol. 23, No. 12, Sep. 1, 1994, pp. 66-70,72,74, XP000462385 ISSN: 0363-6399.

Knight S et al: 'Virtual Router Redundancy Protocol' Internet Citation Apr. 1, 1998, XP002135272 Retrieved from the Internet: URL:ftp://ftp.isi.edu/in-notes/rfc2338.txt [retrieved on Apr. 10, 2000].

Office Action dated Jun. 18, 215, U.S. Appl. No. 13/098,490, filed May 2, 2011.

Perlman R: 'Challenges and opportunities in the design of TRILL: a routed layer 2 technology', 2009 IEEE GLOBECOM Workshops, Honolulu, HI, USA, Piscataway, NJ, USA, Nov. 30, 2009, pp. 1-6, XP002649647, DOI: 10.1109/GLOBECOM.2009.5360776 ISBN: 1-4244-5626-0 [retrieved on Jul. 19, 2011].

TRILL Working Group Internet-Draft Intended status: Proposed Standard RBridges: Base Protocol Specificaiton Mar. 3, 2010.

Office Action dated Jun. 16, 2015, U.S. Appl. No. 13/048,817, filed Mar. 15, 2011.

Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004, pp. 124-131, XP001198207, ISSN: 0163-6804, DOI: 10.1109/MCOM.2004.1304248.

Office Action for U.S. Appl. No. 13/092,873, filed Apr. 22, 2011, dated Nov. 29, 2013.

Perlman, Radia et al., 'RBridges: Base Protocol Specification; Draft-ietf-trill-rbridge-protocol-16.txt', Mar. 3, 2010, pp. 1-117.

'An Introduction to Brocade VCS Fabric Technology', Brocade white paper, http://community.brocade.com/docs/DOC-2954, Dec. 3, 2012.

Brocade, 'Brocade Fabrics OS (FOS) 6.2 Virtual Fabrics Feature Frequently Asked Questions', pp. 1-6, 2009 Brocade Communications Systems, Inc.

Brocade, 'FastIron and TurboIron 24x Configuration Guide', Feb. 16, 2010.

Brocade, 'The Effortless Network: Hyperedge Technology for the Campus LAN' 2012.

Brocade 'Brocade Unveils' The Effortless Network, http://newsroom.brocade.com/press-releases/brocade-unveils-the-effortless-network-nasdaq-brcd-0859535, 2012.

Christensen, M. et al., 'Considerations for Internet Group Management Protocol (IGMP) and Multicast Listener Discovery (MLD) Snooping Switches', May 2006.

FastIron Configuration Guide Supporting Ironware Software Release 07.0.00, Dec. 18, 2009.

(56) References Cited

OTHER PUBLICATIONS

Foundary FastIron Configuration Guide, Software Release FSX 04.2.00b, Software Release FWS 04.3.00, Software Release FGS 05.0.00a, Sep. 2008.
Knight, 'Network Based IP VPN Architecture using Virtual Routers', May 2003.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Lapuh, Roger et al., 'Split Multi-Link Trunking (SMLT)', Network Working Group, Oct. 2012.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-nar ten-n vo3-over l ay-problem -statement-01', Oct. 31, 2011.
Office Action for U.S. Appl. No. 13/092,752, filed Apr. 22, 2011, from Park, Jung H., dated Jul. 18, 2013.
Office Action for U.S. Appl. No. 13/351,513, filed Jan. 17, 2012, dated Jul. 24, 2014.
Office Action for U.S. Appl. No. 13/365,993, filed Feb. 3, 2012, from Cho, Hong Sol., dated Jul. 23, 2013.
Office Action for U.S. Appl. No. 13/742,207 dated Jul. 24, 2014, filed Jan. 15, 2013.
Office Action for U.S. Appl. No. 12/725,249, filed Mar. 16, 2010 dated Apr. 26, 2013.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/365,808, filed Jul. 18, 2013, dated Jul. 18, 2013.
Perlman, Radia et al., 'Challenges and Opportunities in the Design of TRILL: a Routed layer 2 Technology', 2009.
S. Nadas et al., 'Virtual Router Redundancy Protocol (VRRP) Version 3 for IPv4 and IPv6', Internet Engineering Task Force, Mar. 2010.
'RBridges: Base Protocol Specification', IETF Draft, Perlman et al., Jun. 26, 2009.
U.S. Appl. No. 13/030,806 Office Action dated Dec. 3, 2012.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Aug. 14, 2014, U.S. Appl. No. 13/092,460, filed Apr. 22, 2011.
Office action dated Jan. 28, 2013, U.S. Appl. No. 13/092,701, filed Apr. 22, 2011.
Office Action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office Action dated Apr. 9, 2014, U.S. Appl. No. 13/092,752, filed Apr. 22, 2011.

(56) References Cited

OTHER PUBLICATIONS

Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Jul. 7, 2014, for U.S. Appl. No. 13/044,326, filed Mar. 9, 2011.
Office action dated Oct. 2, 2013, U.S. Appl. No. 13/044,326, filed Mar. 9, 2011.
Office Action dated Dec. 19, 2014, for U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office Action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Brocade 'An Introduction to Brocade VCS Fabric Technology', Dec. 3, 2012.
Huang, Nen-Fu et al., 'An Effective Spanning Tree Algorithm for a Bridged LAN', Mar. 16, 1992.
Lapuh, Roger et al., 'Split Multi-link Trunking (SMLT) draft-lapuh-network-smlt-08', Jan. 2009.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/030,688, filed Feb. 18, 2011, dated Jul. 17, 2014.
Office Action for U.S. Appl. No. 13/042,259, filed Mar. 7, 2011, from Jaroenchonwanit, Bunjob, dated Jan. 16, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/950,974, filed Nov. 19, 2010, from Haile, Awet A., dated Dec. 2, 2012.
Office Action for U.S. Appl. No. 12/725,249, filed Mar. 16, 2010, dated Sep. 12, 2012.
Office Action for U.S. Appl. No. 13/098,490, filed May 2, 2011, dated Dec. 21, 2012.
Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/044,301, dated Mar. 9, 2011.
Office Action for U.S. Appl. No. 13/087,239, filed Apr. 14, 2011, dated Dec. 5, 2012.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Office Action for U.S. Appl. No. 13/184,526, filed Jul. 16, 2011, dated Jan. 5, 2015.
Office Action for U.S. Appl. No. 13/184,526, filed Jul. 16, 2011, dated Dec. 2, 2013.
Office Action for U.S. Appl. No. 13/351,513, filed Jan. 17, 2012, dated Feb. 28, 2014.
Office Action for U.S. Appl. No. 13/533,843, filed Jun. 26, 2012, dated Oct. 21, 2013.
Office Action for U.S. Appl. No. 13/598,204, filed Aug. 29, 2012, dated Jan. 5, 2015.
Office Action for U.S. Appl. No. 13/598,204, filed Aug. 29, 2012, dated Feb. 20, 2014.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/092,887, dated Jan. 6, 2014.
Zhai F. Hu et al. 'RBridge: Pseudo-Nickname; draft-hu-trill-pseudonode-nickname-02.txt', May 15, 2012.

(56) References Cited

OTHER PUBLICATIONS

Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office Action for U.S. Appl. No. 13/092,460, filed Apr. 22, 2011, dated Mar. 13, 2015.
Office Action for U.S. Appl. No. 13/092,752, filed Apr. 22, 2011, dated Feb. 27, 2015.
Office Action for U.S. Appl. No. 13/425,238, filed Mar. 20, 2012, dated Mar. 12, 2015.
Office Action for U.S. Appl. No. 13/425,238, dated Mar. 12, 2015.
Office Action for U.S. Appl. No. 13/786,328, filed Mar. 5, 2013, dated Mar. 13, 2015.
Office Action for U.S. Appl. No. 14/577,785, filed Dec. 19, 2014, dated Apr. 13, 2015.
Rosen, E. et al., "BGP/MPLS VPNs", Mar. 1999.
Office action dated Jun. 8, 2015, U.S. Appl. No. 14/178,042, filed Feb. 11, 2014.
Office Action dated May 21, 2015, U.S. Appl. No. 13/288,822, filed Nov. 3, 2011.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated Apr. 1, 2015 U.S. Appl. No. 13/656,438, filed Oct. 19, 2012.
Office Action Dated Jun. 10, 2015, U.S. Appl. No. 13/890,150, filed May 8, 2013.
Mahalingam "VXLAN: A Framework for Overlaying Virtualized Layer 2 Networks over Layer 3 Networks" Oct. 17, 2013 pp. 1-22, Sections 1, 4 and 4.1.
Siamak Azodolmolky et al. "Cloud computing networking: Challenges and opportunities for innovations", IEEE Communications Magazine, vol. 51, No. 7, Jul. 1, 2013.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.

\* cited by examiner

FIG. 2

| INDEX 210 | FLOW ID 212 | FLOW RULES 214 | | GENERIC FLOW DEF FLAG 214 | ACTION 216 | PRIORITY 218 |
|---|---|---|---|---|---|---|
| 0001 | 45 | IN-PORT 155 | RULE 202 | 0 | OUT-PORT 157 | 10 |
| 0002 | 4 | IN-PORT 157 | RULE 204 | 0 | OUT-PORT 156 | 37 |
| 0003 | 12 | IN-PORT 156 | RULE 206 | 0 | OUT-PORT 155 | 23 |
| 0004 | 72 | IN-PORT * | RULE 208 | 1 | OUT-PORT 156 | 19 |

| IN-PORT 155 | RULE 208-1 |
| IN-PORT 156 | RULE 208-2 |
| IN-PORT 157 | RULE 208-3 |

FIG. 3

RULE 208-3 (PRIORITY 19)
RULE 202 (PRIORITY 10)
RULE 204 (PRIORITY 37)
RULE 208-2 (PRIORITY 19)
RULE 206 (PRIORITY 23)
RULE 208-1 (PRIORITY 19)

SYSTEM AND METHOD FOR FLOW MANAGEMENT IN SOFTWARE-DEFINED NETWORKS

RELATED APPLICATIONS

This application claims the benefit of U.S. Provisional Application No. 61/558,332, titled "Per Port Chain for OpenFlow Generic Mode Flows Database," by inventors Kashyap Tavarekere Ananthapadmanabha, Vivek Agarwal, and Eswara S. P. Chinthalapati, filed Nov. 10, 2011, the disclosure of which is incorporated by reference herein.

BACKGROUND

1. Field

The present disclosure relates to network management. More specifically, the present disclosure relates to a method and system for efficient management of flow definitions in a software-defined network.

2. Related Art

The exponential growth of the Internet has made it a popular delivery medium for heterogeneous data flows. Such heterogeneity has caused an increasing demand for bandwidth. As a result, equipment vendors race to build larger and faster switches with versatile capabilities, such as defining data flows using software, to move more traffic efficiently. However, the complexity of a switch cannot grow infinitely. It is limited by physical space, power consumption, and design complexity, to name a few factors. Furthermore, switches with higher and versatile capability are usually more complex and expensive.

Software-defined flow is a new paradigm in data communication networks. Any network supporting software-defined flows can be referred to as software-defined network. An example of a software-defined network can be an OpenFlow network, wherein a network administrator can configure how a switch behave based on data flows that can be defined across different layers of network protocols. A software-defined network separates the intelligence needed for controlling individual network devices (e.g., routers and switches) and offloads the control mechanism to a remote controller device (often a stand-alone server or end device). Therefore, a software-defined network provides complete control and flexibility in managing data flow in the network.

While support for software-defined flows brings many desirable features to networks, some issues remain unsolved in management of flow definitions. For example, because software-defined networks redefine traditional data flow management, coexistence of software-defined network with current network architecture can be challenging.

SUMMARY

One embodiment of the present invention provides a system for facilitating flow definition management in a switch. During operation, the system identifies a generic flow definition which specifies a flow that is not specific to any input port of a switch. The system further stores in a flow lookup data structure one or more port-specific flow rules based on the generic flow definition, wherein each port-specific flow rule corresponds to a respective port capable of processing data flows.

In a variation on this embodiment, the system includes a content addressable memory (CAM), wherein the flow lookup data structure is stored in the CAM.

In a variation on this embodiment, the system includes a flow table configurable to store the generic flow definition with a flag indicating that the generic flow definition is not specific to any input port.

In a variation on this embodiment, the switch is an OpenFlow-capable switch.

In a variation on this embodiment, the system maintains a per-port linked list for a respective port capable of processing data flows. A node in the linked list indicates a flow identifier for a flow definition applicable to the port. Further, the nodes in the linked list are sorted in the order of priority of the corresponding flow definitions.

In a further variation, the system stores in a flow table one or more flow definitions with corresponding flow identifier(s).

In a further variation, a respective entry in the flow table stores a flow definition. In addition, the system computes a hash value based on the flow identifier for the flow definition, and uses the hash value as an index to the entry.

In a further variation, the system updates a flow definition. In doing so, the system traverses a per-port linked list for a port associated with the flow definition to be updated to locate a flow identifier for the flow definition to be updated. In addition, the system determines one or more flow identifiers whose priority is lower than the located flow identifier. The system then rewrites the flow rules associated with the determined flow identifiers in the flow lookup data structure, thereby preserving the priority order of the flow rules for the port after the update.

BRIEF DESCRIPTION OF THE FIGURES

FIG. 2 illustrates an exemplary flow table with per-port expansion of generic flow definition of a software-defined network, in accordance with an embodiment of the present invention.

FIG. 3 illustrates how the flow rules in FIG. 2 can be stored in a CAM, in accordance with an embodiment of the present invention.

In the figures, like reference numerals refer to the same figure elements.

DETAILED DESCRIPTION

Figure 1A:
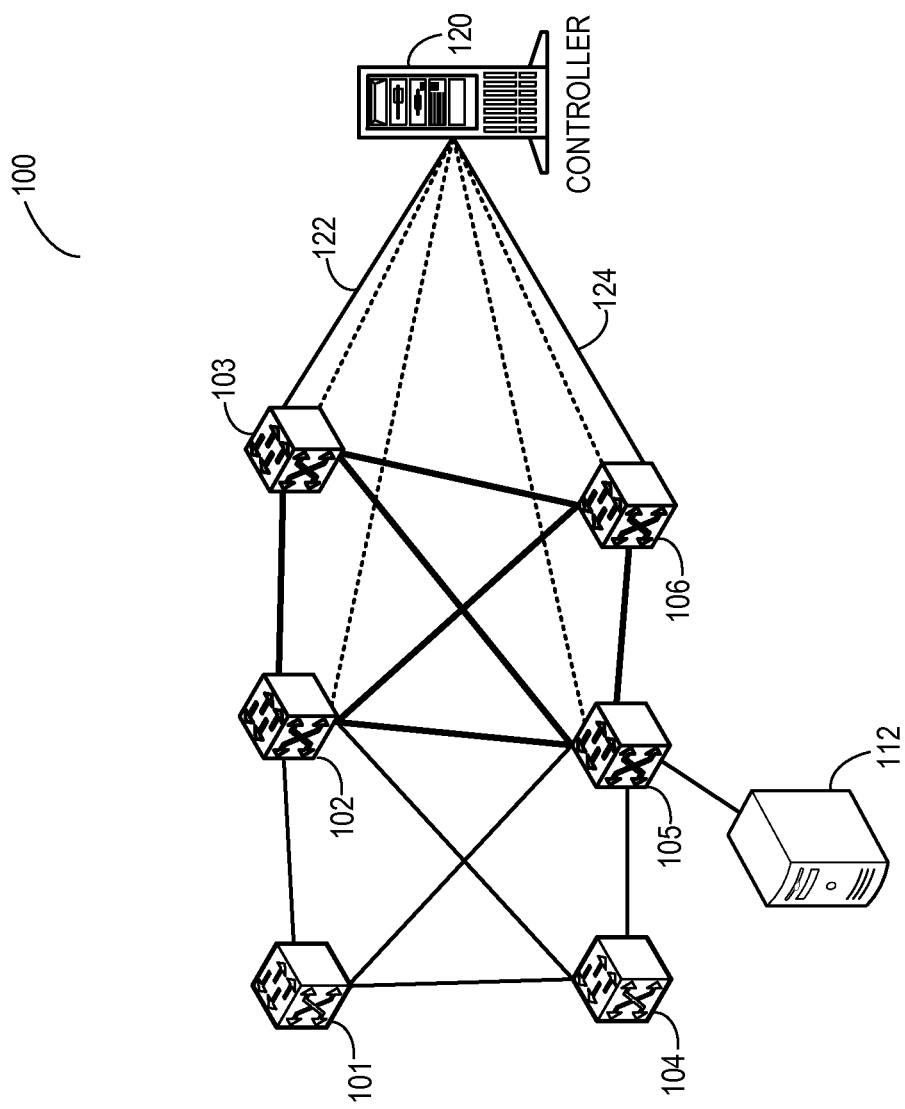
FIG. 1A illustrates an exemplary software-defined network, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of facilitating coexistence of conventional ports and ports that support software-defined flows in a switch and improving the efficiency of updating flow definitions in a software-defined network is solved by (1) converting a non-port-specific (generic) flow rule to one or more port-specific flow rules; and (2) providing per-port linked-lists of pointers to flow rules, thereby allowing updating flow definitions on a per-port basis.

In general, it is desirable to partition the ports of a switch in a software-defined network into two logical groups. One logical group supports traditional packet forwarding and the other group supports forwarding based on software-defined flows. Ideally, the switch should preclude software-based flow definitions (such as those defined using OpenFlow) to the ports reserved for traditional packet forwarding. However, with the existing technologies, a flow definition that does not specify an input port is usually applied to all the ports of a switch, regardless of whether it is configured for traditional packet forwarding or for software-defined flow forwarding. Hence, erroneous forwarding decision might occur with such non-port-specific (also referred to as "generic") flow definitions.

A second problem faced by the existing software-defined network architecture is that the flow definitions for the entire switch are maintained in a single linked list, typically in the order of priority. When the network administrator needs to update a rule definition (i.e., add, delete, or change), the switch needs to traverse the entire linked list to identify the location for the update. Also, since the flow definitions are typically stored in a content addressable memory (CAM), the physical storage location for each flow definition corresponds to the definition's priority. Hence, if a flow definition's priority changes (or if it is being added or deleted), all the flow definitions with lower priorities need to be re-written in the CAM, so that their new storage locations reflect the change in the priority order. This update mechanism is inefficient, especially as the number of flow definitions grows big.

The solutions described herein to the above problems are two-fold. First, for a generic, non-port-specific flow definition, the system converts this generic flow definition into one or more port-specific rules for all the ports configured to perform software-defined flow forwarding. As a result, ports reserved for conventional packet forwarding are no longer subject to the software-based flow definitions. Second, for each port configured to perform software-defined flow forwarding, a per-port, priority-ordered linked list stores pointers to flow definitions only associated with that port. Hence, when a flow definition is added, deleted, or modified, the system only needs to traverse the per-port linked list to locate the flow definitions that need to be changed in the CAM. As a result, the amount of overhead associated with flow definition updates can be significantly reduced.

In this disclosure, the term "software-defined network" refers to a network that facilitates control over a respective data flow by specifying the action associated with the flow in a flow definition. A controller, which can be a server, coupled to the software-defined network provides a respective switch in the software-defined network with the flow definitions. A flow definition can include a priority value, a rule that specifies a flow, and an action (e.g., a forwarding port or "drop") for the flow. The rule of a flow definition can specify, for example, any value combination in the ten-tuple of {in-port, VLAN ID, MAC SA, MAC DA, Ethertype, IP SA, IP DA, IP Protocol, TCP source port, TCP destination port}. Other packet header fields can also be included in the flow rule. Depending on its specificity, a flow rule can correspond to one or more flows in the network. Upon matching a respective packet to a rule, the switch in the software-defined network takes the action included in the corresponding flow definition. An example of a software-defined network includes, but is not limited to, OpenFlow, as described in Open Networking Foundation (ONF) specification "OpenFlow Switch Specification," available at http://www.openflow.org/documents/openflow-spec-v1.1.0.pdf, which is incorporated by reference herein.

In this disclosure, a switch in a software-defined network and capable of processing software-defined flows is referred to as a "software-definable" switch. Such a software-definable switch can include both ports that process software-defined flows and ports reserved for convention packet forwarding (e.g., layer-2/Ethernet switching, or IP routing), which are referred to as "regular ports" in this disclosure. A flow definition typically includes one or more software-definable in-ports to which the definition is applicable. Any flow arriving via any port can potentially be a match for the generic flow definition.

In some embodiments, the software-defined network is a fabric switch and a respective switch in the software-defined network is a member switch of the fabric switch. The fabric switch can be an Ethernet fabric switch. In an Ethernet fabric switch, any number of switches coupled in an arbitrary topology may logically operate as a single switch. Any new switch may join or leave the fabric switch in "plug-and-play" mode without any manual configuration. A fabric switch appears as a single logical switch to the end device.

Although the present disclosure is presented using examples based on OpenFlow, embodiments of the present invention are not limited to networks defined OpenFlow or a particular Open System Interconnection Reference Model (OSI reference model) layer. In this disclosure, the term "software-defined network" is used in a generic sense, and can refer to any network which facilitates switching of data flows based on software-defined rules. The term "flow definition" is also used in a generic sense, and can refer to any rule which identifies a frame belonging to a specific flow and/or dictates how a switch should process the frame.

The term "end device" can refer a host, a conventional layer-2 switch, or any other type of network device. Additionally, an end device can be coupled to other switches or hosts further away from a network. An end device can also be an aggregation point for a number of network devices to enter the network.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "switch" is used in a generic sense, and it can refer to any standalone or fabric switch operating in any network layer. "Switch" should not be interpreted as limiting embodiments of the present invention to layer-2 networks. Any device that can forward traffic to an end device can be referred to as a "switch." Examples of a "switch" include, but are not limited to, a layer-2 switch, a layer-3 router, a TRILL RBridge, an FC router, or an FC switch.

The term "Ethernet fabric switch" refers to a number of interconnected physical switches which form a single, scalable logical switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally.

Network and Switch Architecture

As mentioned above, in a switch in a software-defined network, a generic flow definition could be applied to a software-definable port or a regular port. As a result, the isolation between software-definable ports and regular ports is compromised, and the switch can undesirably forward regular traffic based on a generic flow definition. Typically, upon receiving a flow definition from a controller, a conventional switch in software-defined network uses a single data structure (such as a master linked-list) to store all flow definitions for all ports. In hardware (e.g., CAM), the corresponding flow rules are typically stored based on the respective priorities of the flow definitions. When the controller sends instruction to the switch to add a new flow definition or update (i.e., delete or modify) an existing flow definition, the switch adds, deletes, or modifies the corresponding flow definition in the master linked-list. However, to delete or modify, the switch searches the entire master linked-list to find the flow definition. Moreover, because the flow rules are also stored in the CAM based on the respective priorities (since the system uses the flow rules stored in the CAM for real-time packet processing), to add or delete a new flow definition, the switch searches the entire list to find the appropriate position for the flow definition and has to shift all the entries in the CAM with priorities lower than the added or deleted flow definition. Furthermore, if the priority of an existing flow definition changes, the same location shift has to be done for all affected entries in the CAM. As a result, the switch incurs significant overhead of rewriting when one needs to modify a flow definition, although the modified flow definition might be related to only a subset of all the software-definable ports.

To solve this problem, a switch in a software-defined network associates a generic flow definition with all the software-definable ports in the switch and storing multiple port-specific flow rules (corresponding to each software-definable port) in the CAM. Upon receiving a generic flow definition from the controller, the switch identifies the software-definable ports in the switch and creates a flow rule for a respective software-definable port by inserting the corresponding port index in the "in-port" field of the flow rule. In this way, the switch expands the generic flow definition to multiple port-specific flow rules corresponding to the software-definable ports. This expansion ensures isolation of regular ports from software-definable ports. Consequently, the switch applies a flow definition only to software-defined ports.

The switch also creates a per-port linked list (also referred to as "per-port chain"), which is a list of pointers or identifiers corresponding to flow definitions for a respective software-definable port (i.e., the flow definitions which have the port as in-port). In some embodiments, the switch creates a flow identifier (or a flow ID) for each flow definition. The switch stores the flow definition and its corresponding flow identifier in a table (referred to as "flow table" in this disclosure). The switch stores the flow identifiers of the flow definitions for a given port in the corresponding per-port chain. In other words, each link in a per-port chain is a flow ID. In addition, a respective per-port chain is ordered based on each link's priority (i.e., the corresponding flow definition's priority). Hence, when a flow definition needs to be updated, the switch can traverse the per-port chain for the associated port, identify the flow IDs along the chain whose priority is lower than the flow definition being updated, and only rewrite the flow rules in the CAM corresponding to those affected flow IDs. As a result, the switch can avoid unnecessarily rewriting entries in the CAM that are not related to the affected port, and hence avoid unnecessary down time for those unaffected ports. Furthermore, because the flow definition is stored in the flow table, and each port only maintains a per-port chain which includes only flow IDs, if a flow definition is associated with a plurality of in-ports (e.g., a generic flow definition), the switch can just store the generic definition once with a set "generic-flow flag" in the flow table, and use the same flow ID in multiple per-port chains.

In some embodiments, the flow table is a hash table and the flow ID can be used as hash keys to generate a hash value, which is then used as an index to the flow table to map to a flow definition. In addition, since the per-port chain is ordered based on the flow definitions' priority, the position of each link in the chain inherently carries with it the priority information. In addition, for the flow rules corresponding to the links in a per-port chain, the storage locations of these flow rules in the CAM are also ordered in the same priority order. In this way, when the switch performs a CAM lookup for an incoming packet, the lookup result returned by the CAM automatically reflects the matching flow rule with the highest priority. Note that the flow rules stored in the CAM are all port-specific, assuming that a generic flow definition has been converted to multiple port-specific flow rules for the individual ports. Further, depending on the implementation, a larger or smaller numeric priority value may correspond to higher or lower priority. In one embodiment, the switch does not store the expanded generic flow definitions (i.e., multiple port-specific flow definitions, each for a different software-definable port) in the flow table. Instead, the switch stores the generic flow definition only once in the flow table, with a set generic-flow flag (to distinguish the generic flow definition from other port-specific definitions), and inserts the corresponding flow ID into a respective port chain.

FIG. 1A illustrates an exemplary software-defined network, in accordance with an embodiment of the present invention. A heterogeneous software-defined network 100 includes regular switches 101 and 104. Also included are switches 102, 103, 105, and 106, which are capable of processing software-defined flows. Switches 102, 103, 105, and 106 are software-definable switches. Controller 120 is logically coupled to a respective software-definable switch in network 100. Note that controller 120 can be physically coupled to only a subset of the switches. In this example, controller 120 is coupled to switches 103 and 106 via physical links 122 and 124, respectively. End device 112 is coupled to network 100 via software-definable switch 105.

Software-definable switch 102 includes one or more software-definable ports. Switch 102 uses its software-definable ports to couple other software-definable switches 103, 105, and 106. Similarly, software-definable switches 103, 105, and 106 also use their respective software-definable ports to couple other software-definable switches. Switch 102 also includes regular ports coupled to regular switches 101 and 104. During operation, controller 120 sends flow definitions to switches 102, 103, 104, and 105. Switch 102 receives a flow definition and checks whether the flow definition is a generic flow definition. If so, any flow arriving to switch 102 via any port can potentially be a match for the generic flow definition.

To ensure isolation between software-definable ports and regular ports, and avoid forwarding regular traffic based on the generic flow definition, in switch 102 generates multiple port-specific flow rules based on the generic flow definition, one for each software-definable port. In some embodiments, switch 102 creates these new flow rules by adding a respective software-definable port as the in-port to the generic flow definition. Switch 102 then inserts the generic flow definition in a local flow table with a set generic-flow flag, and writes the generated port-specific flow rules to its local CAM. Similarly, upon receiving the generic flow definition, switches 103, 105, and 106 also insert the generic flow definition with the generic-flow flag in their respective local flow tables and stores the generated port-specific flow rules in their respective CAM. Switches 102, 103, 105, and 106, thus, always apply a flow definition to flows coming from software-definable ports, and avoid applying the flow definition to traffic received from regular ports.

In some embodiments, a respective software-definable switch in network 100 creates a per-port chain of flow definitions for a respective software-definable port. For example, software-definable switch 103 creates a per-port chain for the software-definable ports which couple switches 102, 105, and 106. Switch 103 sorts the per-port chain based on the priority of the flow definitions. When switch 103 receives a flow definition from controller 120, switch 103 creates a flow ID for the flow definition and stores the flow definition and its corresponding flow ID in a flow table. In addition, switch 103 stores the flow IDs of the flow definitions for the port in the corresponding per-port chain. The flow table in switch 103 can be a hash table where flow IDs are hash keys for locating the corresponding flow definitions in the flow table. Similarly, software-definable switches 102, 105, and 106 also store the flow definitions in a hash table and the corresponding flow IDs in local per-port chains.

Figure 1B:
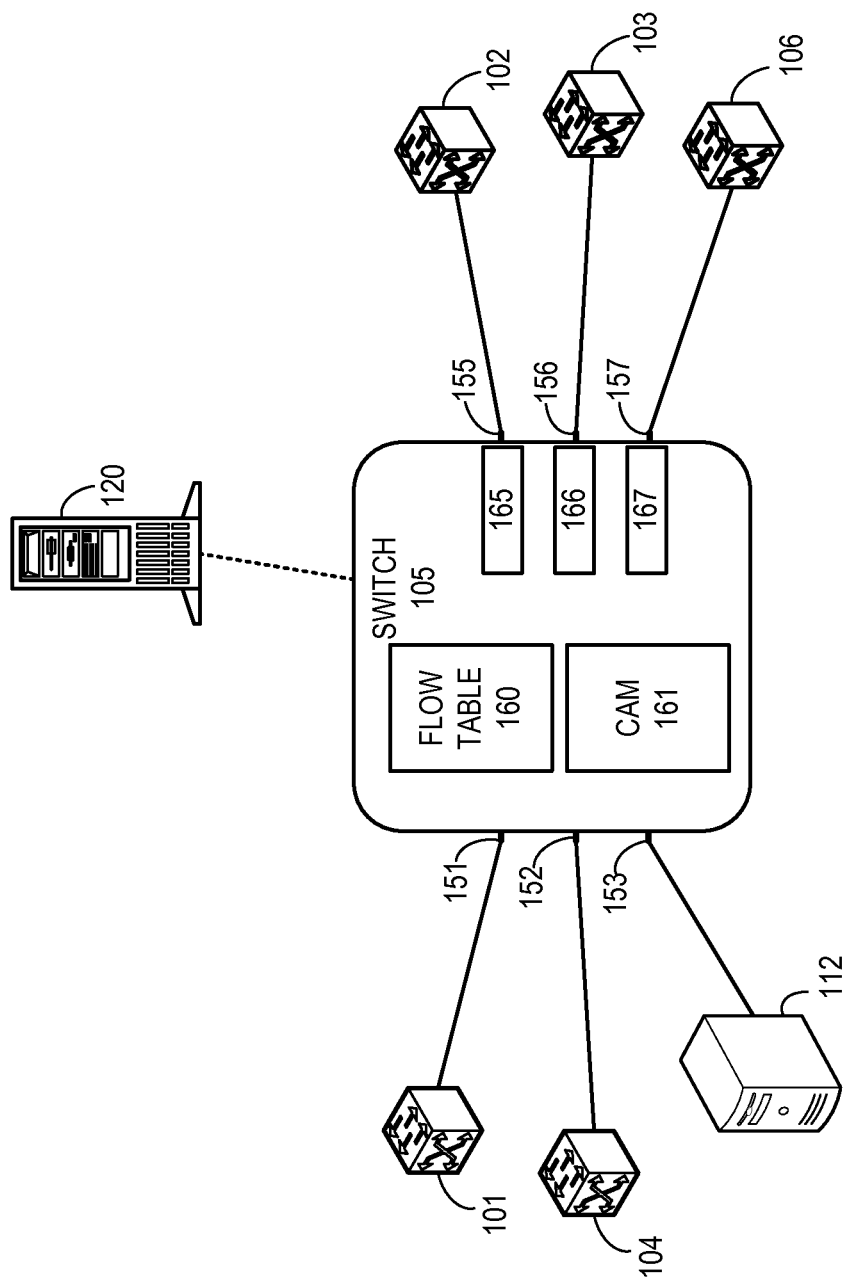
FIG. 1B illustrates an exemplary switch in a software-defined network, in accordance with an embodiment of the present invention.

FIG. 1B illustrates an exemplary switch in a software-defined network, in accordance with an embodiment of the present invention. In this example, software-definable switch 105 is coupled to other software-definable switches 102, 103, and 106 via software-definable ports 155, 156, and 157, respectively. Switch 105 also includes regular ports 151, 152, and 153, which are not software-definable and couple regular switches 101 and 104, and end device 112, respectively. During operation, controller 120 sends a flow definition to switch 105. If the flow definition is a generic flow definition, switch 105 expands the generic flow definition by creating a port-specific flow rule for each of ports 155, 156, and 157 based on the generic flow definition. Switch 105 then stores the generic flow definition in flow table 160 with a set generic-flow flag and stores the generated per-port flow rules in a CAM 161. Switch 105, thus, only applies the generic flow definition to flows coming via ports 155, 156, and 157.

Furthermore, switch 105 also creates per-port chains 165, 166, and 167 for ports 155, 156, and 157, respectively. Per-port chains 165, 166, and 167 are sorted based on the priority of the flow definitions associated with the respective port. When switch 105 receives a flow definition (either generic or port-specific) from controller 120, switch 105 creates a flow ID for the flow definition. Switch 105 stores the flow definition and the corresponding flow ID in flow table 160. Switch 105 then inserts the flow ID in the corresponding per-port chain in sorted order. Suppose that the flow definition is for port 155. Switch 105 stores the flow ID in per-port chain 165. If the flow definition is a generic flow definition, switch 105 stores the flow ID in per-port chains 165, 166, and 167. In this way, switch 105 can store a generic flow definition only once.

During operation, switch 105 receives a frame from switch 102 via port 155. Switch 105 extracts the frame's header information and performs a lookup in CAM 161. CAM 161, which stores port-specific flow rules, returns a result that indicates a matching flow definition with the highest priority. Note that, since a generic flow definition is stored as multiple port-specific flow rules in CAM 161, the generic flow definition is automatically included in the CAM lookup. Switch 105 identifies and performs the action specified in the matching flow definition.

Generic Flow Definition Expansion

In the example in FIG. 1B, flow table 160 can include a plurality of entries corresponding to a plurality of flow definitions. FIG. 2 illustrates an exemplary flow table with per-port expansion of generic flow definition of a software-defined network, in accordance with an embodiment of the present invention. In this example, each entry in flow table 160 of switch 105 includes the following fields: an index field 210, a flow ID field 212, a flow rule field 214, a generic flow definition flag field 214, an action field 216, and a priority field 218. Additional fields carrying other flow-related information can also be included in flow table 160.

Index field 210 stores the index to each entry (i.e., a flow definition). In one embodiment, the index to a given entry is the hash value of the flow ID for the corresponding flow definition. Flow ID field 212 stores the flow ID for a given entry. Flow rule field 214 stores the specific header field values which need to be matched to identifying a particular flow. A flow rule can include one or more of: an input port (in-port), a layer-2 source address, a layer-2 destination address, a layer-2 frame type, a VLAN ID, a layer-3 source address, a layer-3 destination address, a layer-4 (e.g., transport layer) protocol, a layer-4 source address, and a layer-4 destination address.

Generic flow definition flag field 214 stores a one-bit flag for each entry to indicate whether the flow definition is a generic definition, which applies to all the software-definable ports. Action field 216 stores the action to be taken for a given flow, such as an output port ("out-port") or "drop." In one embodiment, action field 216 may store a pointer to an "action table" (not shown) that contains information describing more complex operations for a flow. Priority field 218 stores the priority value associated with each flow definition.

In this example, flow definitions 251, 252, and 253 are respectively associated with to input ports 155, 157, and 156, as specified by the "in-port" field of their respective flow rules 202, 204, and 206. If a frame's header fields match what is specified in rule 202, 204, or 206, the switch forwards the frame to port 157, 156, or 155, respectively, as specified in the action field of each flow definition.

For each non-generic flow definition, as indicated by a "0" in its generic flow definition flag 214, the corresponding flow rule is stored in the switch's CAM for line-speed lookups. The locations of these rules in the CAM reflect their priority order, on a per port basis.

Flow table 160 can also include a generic flow definition 254, which does not specify a particular in-port in its corresponding flow rule 208 (as indicated by the wildcard character "*"). Generic flow definition 254 specifies in action field 216 an out-port 156. In one embodiment, switch 105 expands flow rule 208 of generic flow definition 254 by creating a new port-specific flow rule for each software-definable port, namely ports 155, 156, and 157. The newly created rules 208-1, 208-2, and 208-3 each specifies port 155, 156, and 157 as their respective in-port. Switch 105 then stores rules 208-1, 208-2, and 208-3 in its CAM based on their priority order for each the in-port. Note that the expanded rules 208-1, 208-2, and 208-3 all inherit the same priority value ("19") from generic flow definition 254. Assume that a greater priority value indicates a higher priority. Hence, in the CAM, for all the flow rules associated with in-port 155, rule 208-1 (priority 19) is stored before rule 202 (priority 10). However, for all the flow rules associated with in-port 156, rule 208-2 (priority 19) is stored after rule 206 (priority 23). Similarly, for all the flow rules associated with in-port 157, rule 208-3 (priority 19) is stored after rule 204 (priority 37).

FIG. 3 illustrates how the flow rules in FIG. 2 can be stored in a CAM, in accordance with an embodiment of the present invention. In this example, a lower storage position in the CAM corresponds to a higher priority of the flow rule. Note that the entire set of flow rules are not stored in a strict priority order. However, for all the rules associated with a given in-port, the storage locations of these rules preserve their priority order. For example, rule 208-1 is stored below rule 206, although rule 208-1's priority is lower than rule 206's priority. Nevertheless, rule 208-1 and rule 206 are associated with different in-ports, hence their relative locations in the CAM do not affect the lookup (since a frame can arrive from one in-port and hence can only match one of these two rules). However, for rules associated with the same in-port, for example, rule 208-1 and rule 202, their relative positions in the CAM preserve their priority order (i.e., rule 208-1 is stored below rule 202, since rule 208-1 has a higher priority). The priority order of the rules for each in-port is maintained by a per-port chain, as described below.

Per-Port Chain

As mentioned earlier, in conventional switches, all the flow rules are stored in the CAM based on a switch-wide priority order. Such configuration results in significant overhead when a flow rule is added, deleted, or changes its priority, because all the rules in the CAM with priority lower than the changed rule need to be rewritten to new locations. Embodiments of the present invention mitigate this problem by using a per-port chain, which is a port-specific linked list of flow IDs sorted in their priority order. These per-port chains keep track of the priority order of all the flow rules for a particular port. When a flow rule for a port needs to be changed, only those rules with lower priority for that port, as indicated by the per-port chain, need to be rewritten in the CAM.

Figure 4A:
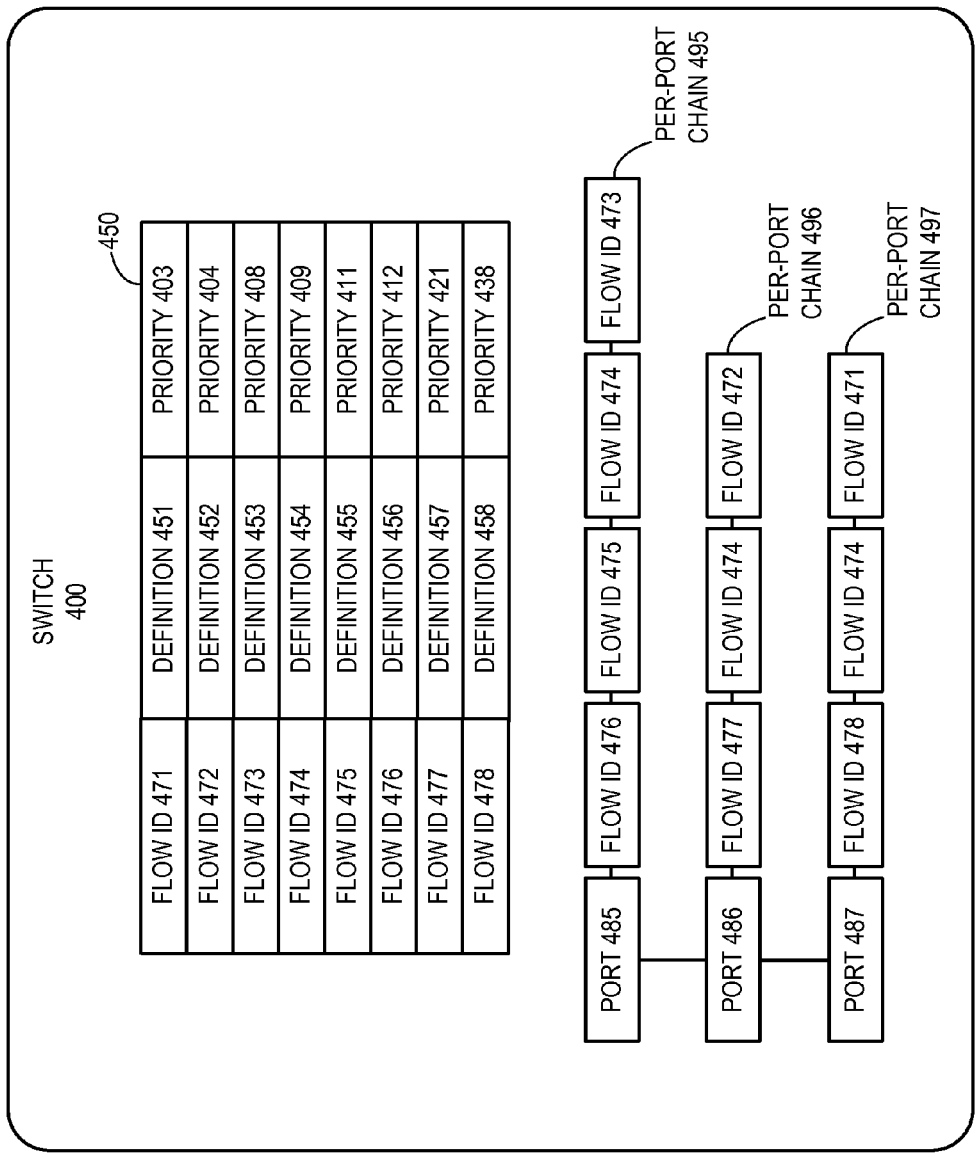
FIG. 4A illustrates an exemplary port chain for flow definitions of a software-defined network, in accordance with an embodiment of the present invention.

FIG. 4A illustrates an exemplary per-port chain for flow definitions of a software-defined network, in accordance with an embodiment of the present invention. In this example, a flow table 450 in switch 400 includes flow definitions 451, 452, 453, 454, 455, 456, 457, and 458, with flow ID 471, 472, 473, 474, 475, 476, 477, and 478, and priority values 403, 404, 408, 409, 411, 412, 421, and 438, respectively. Note that not all fields of flow table 450 are shown.

Switch 400 creates per-port chains 495, 496, and 497 for local software-definable ports 485, 486, and 487, respectively. Per-port chain 495 includes flow IDs 476, 475, 474, and 473, sorted based on the priority values of the corresponding flow definitions 456, 455, 454, and 453, respectively. Similarly, per-port chain 496 includes flow IDs 477, 474, and 472, sorted based on the priority values of the corresponding flow definitions 457, 454, and 452, respectively. Per-port chain 497 includes flow IDs 478, 474, and 471, sorted based on the priority values of the corresponding flow definitions 458, 454, and 451, respectively.

During operation, switch 400 receives an update to a flow definition (say flow definition 455) which changes its priority. Switch 400 first searches flow table 450 to identify flow definition 455's flow ID, which is flow ID 475. Switch 400 then identifies that flow definition 455 is associated with port 485. In response, switch 400 traverses per-port chain 495 to identify the position of flow ID 475, as well as the flow IDs affected by the update. After the update, per-port chain 495 would have a new priority order. Switch 400 then rewrites in the CAM all the flow rules corresponding to the affected flow IDs. Note that the CAM rewriting only affects the rules associated with port 485. Hence, during such rule updates, the CAM can remain function for the unaffected ports. The service disruption can therefore be significantly reduced.

Figure 4B:
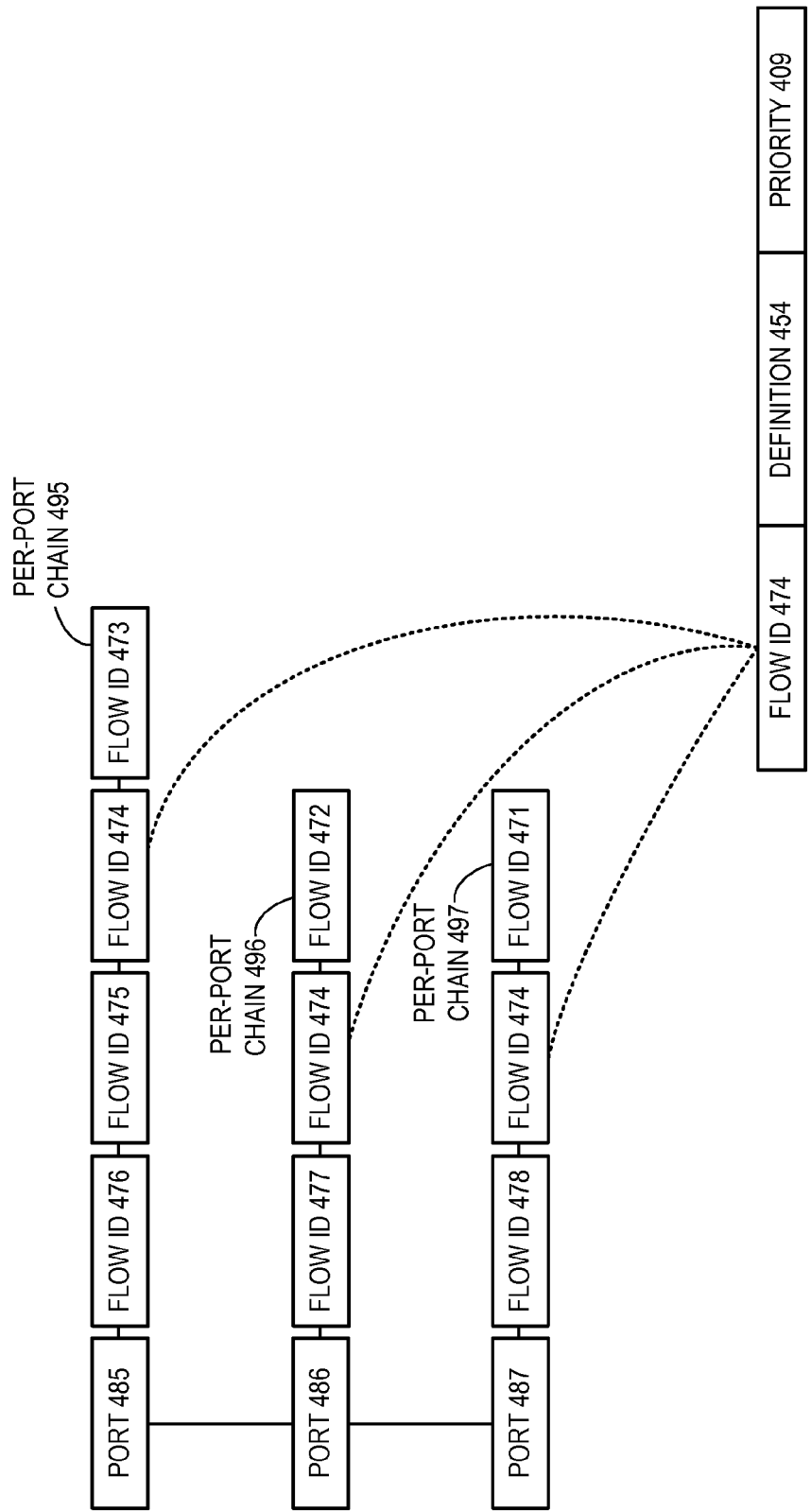
FIG. 4B illustrates a generic flow definition in relation to per-port chains, in accordance with an embodiment of the present invention.

FIG. 4B illustrates a generic flow definition in relation to per-port chains, in accordance with an embodiment of the present invention. Assuming flow definition 454 is a generic flow definition, the corresponding flow ID 474 is included in per-port chains 495, 496, and 497. Note that, as described previously in conjunction with FIGS. 2 and 3, flow definition 454 corresponds to multiple port-specific flow rules stored in the CAM. When the switch needs to update flow definition 454, the system first determines that flow definition 454 is a generic definition. The system then traverses the per-port chain for every port to identify the affected flow IDs, and rewrite, as necessary, all the affected flow rules in the CAM.

Figure 5A:
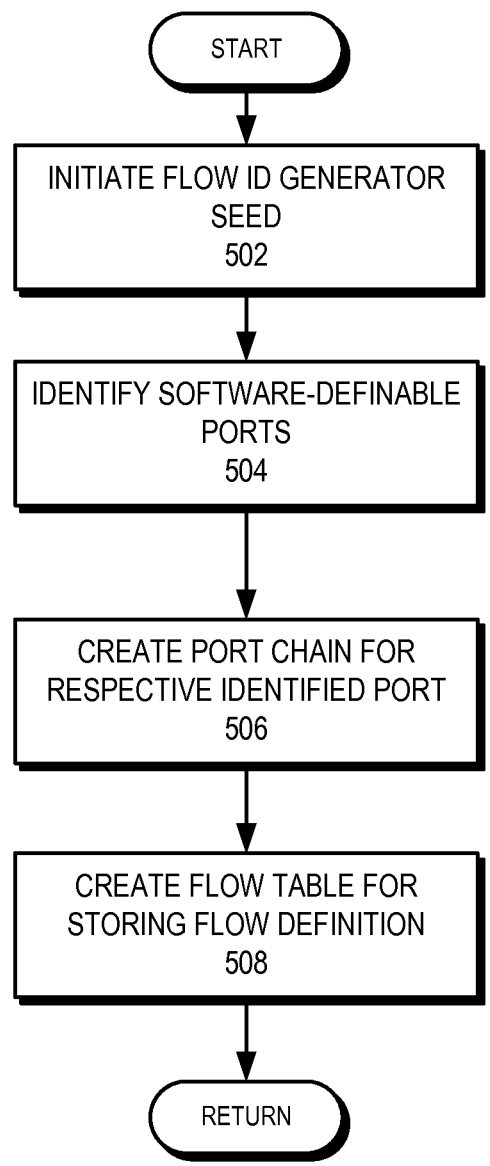
FIG. 5A presents a flowchart illustrating the process of initiating per-port chain and a corresponding flow table, in accordance with an embodiment of the present invention.

In the example in FIG. 1B, switch 105 first initiates per-port chains 165, 166, and 167 for the flow definitions in flow table 160. Switch 105 then performs the necessary operations (e.g., adding, deleting, and updating) for a flow definition using both flow table 160 and per-port chains 165, 166, and 167. FIG. 5A presents a flowchart illustrating the process of initiating per-port chain and a corresponding flow table, in accordance with an embodiment of the present invention. During operation, the switch first initiates a seed for a flow ID generator (operation 502). Examples of a flow ID generator include, but are not limited to, a random number generator and a sequential number generator.

The switch then identifies the software-definable ports in the switch (operation 504). In some embodiments, a network administrator allocates a subset of the ports of the switch as the software-definable ports. For example, the network administrator can enable OpenFlow for the subset of the ports to allocate the ports as software definable. The switch then creates a per-port chain for a respective software-definable port (operation 506). A per-port chain can be a linked list or a doubly-linked list. The switch then creates a flow table for storing flow definitions (operation 508). Note that the switch creates a separate entry in the flow table for a respective flow definition. In some embodiments, the flow table is a hash table and a flow ID can be used as a hash key.

Figure 5B:
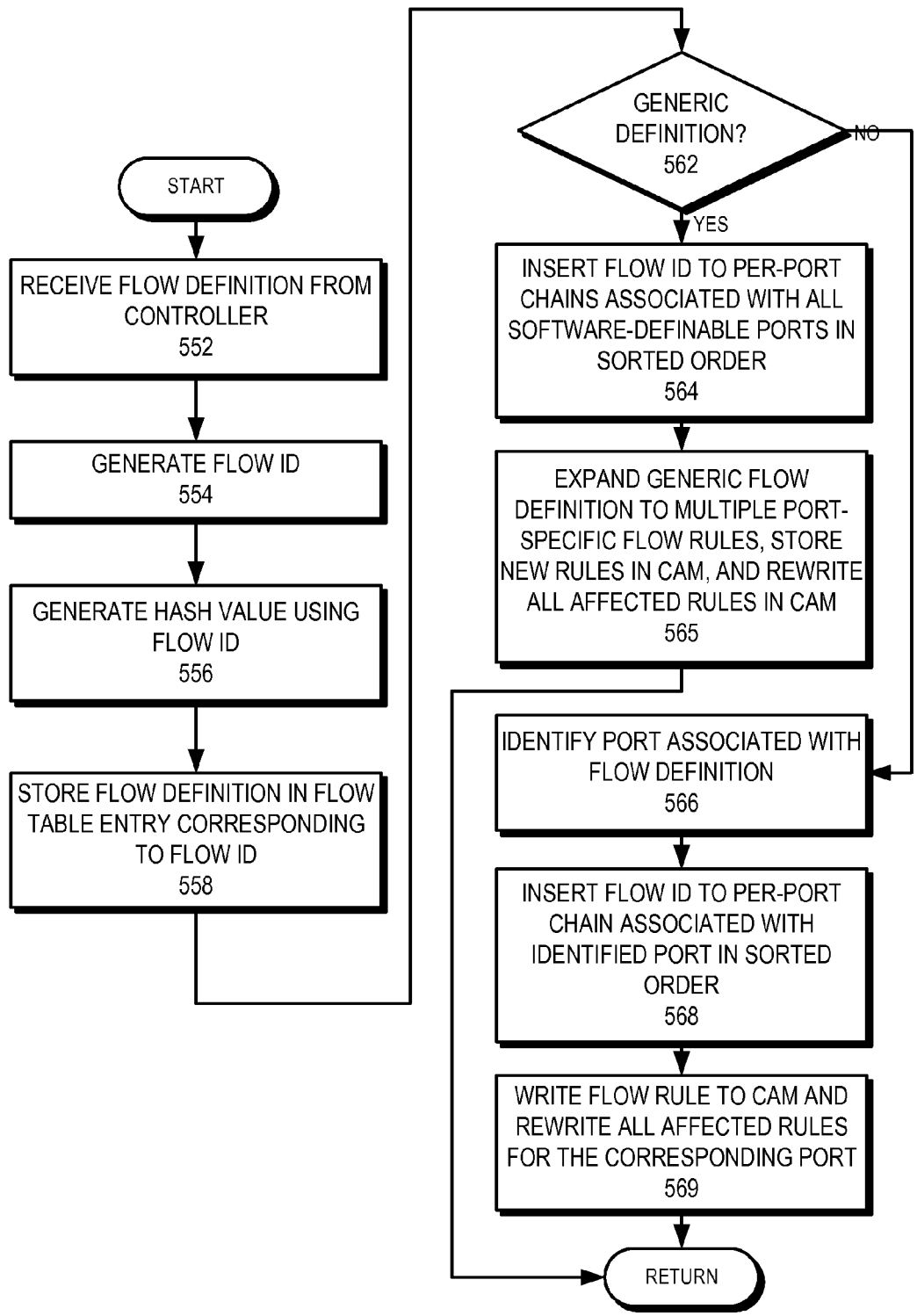
FIG. 5B presents a flowchart illustrating the process inserting a new flow definition using a flow ID, in accordance with an embodiment of the present invention.

FIG. 5B presents a flowchart illustrating the process inserting a new flow definition using a flow ID, in accordance with an embodiment of the present invention. During operation, the switch receives a flow definition from a controller (operation 552). The switch then generates a flow ID (operation 554). This flow ID can be local to the switch. For the same flow definition, a different switch can have a different local flow ID. The switch applies the flow ID as a key to a hash function to generate a hash value (operation 556). The switch then stores the flow definition with the flow ID as an entry in a flow table entry (operation 558). The hash value is the index to this entry.

Next, the switch checks whether the flow definition is a generic flow definition (operation 562). If so, the switch inserts the flow ID into the per-port chains associated with all software-definable ports based on the flow definition's priority (operation 564). In addition, the switch expands this generic flow definition to multiple port-specific flow rules. The switch then stores these new rules in the CAM and rewrites all the affected rules in the CAM (i.e., rules whose position is affected by the new rule) (operation 565). If the flow is not a generic flow definition, the switch identifies the in-port associated with the flow definition (operation 566). The switch then inserts the flow ID into the per-port chain associated with the identified port in the switch based on the flow definition's priority (operation 568). Subsequently, the switch writes the flow rule to the CAM, and rewrites all affected rules for the corresponding port (operation 569).

Figure 6:
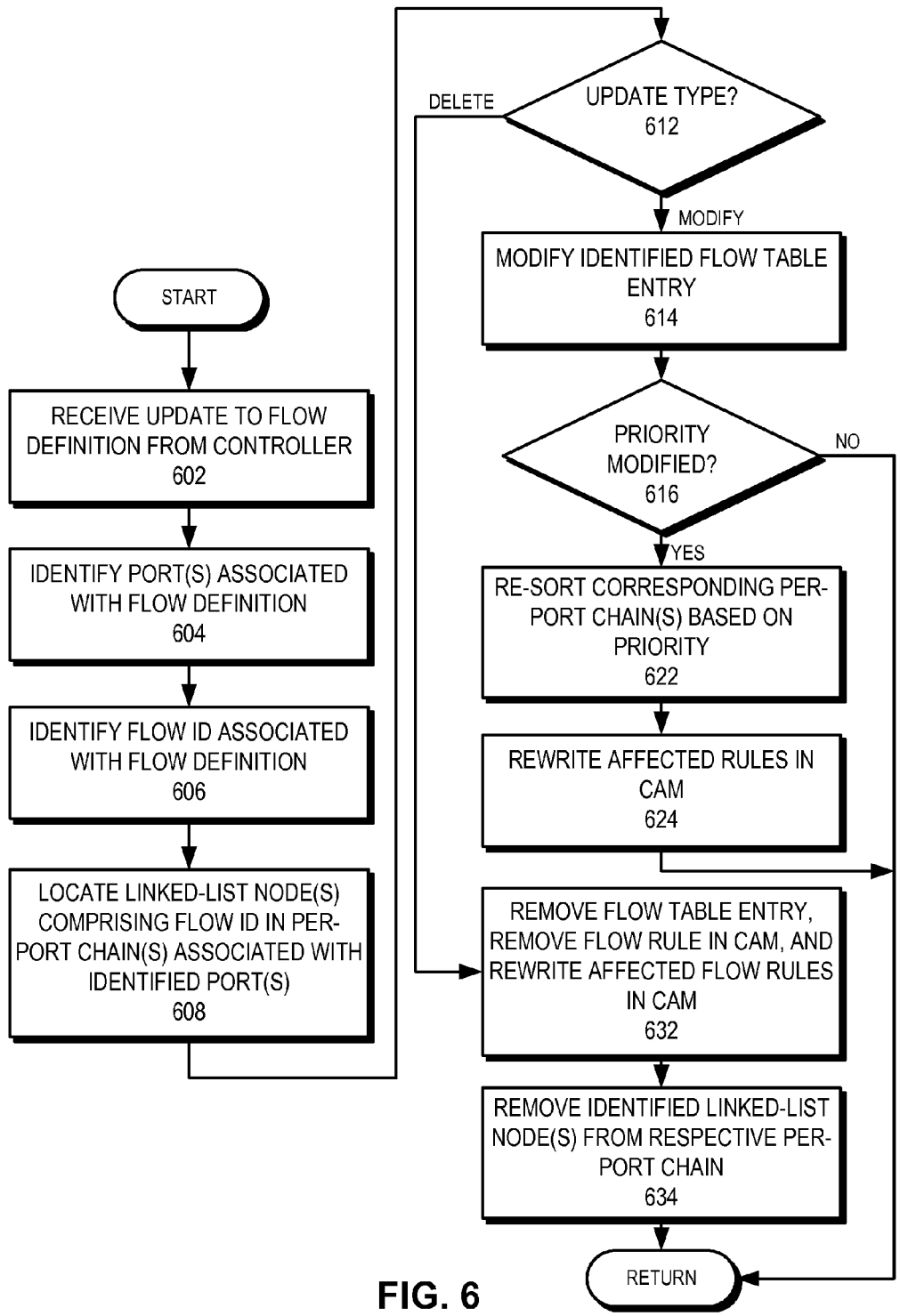
FIG. 6 presents a flowchart illustrating the process of a switch in a software-defined network updating a flow definition using a flow identifier, in accordance with an embodiment of the present invention.

FIG. 6 presents a flowchart illustrating the process of updating a flow definition, in accordance with an embodiment of the present invention. An update to a flow definition can include a deletion or a modification to the flow definition. During operation, the switch receives an update to an existing flow definition from a controller (operation 602). In response, the switch identifies the port(s) associated with the flow definition (operation 604). If the flow definition is a generic flow definition, the flow definition is associated with all software-definable ports in the switch. The switch further identifies the flow ID associated with the flow definition by, for example, searching the flow table (operation 606). The switch locates the linked-list node(s) comprising the flow ID in the per-port chain(s) associated with the identified port(s) (operation 608).

The switch then checks the update type (operation 612). If the update type is "delete," the switch removes the located flow table entry, removes the flow rule from the CAM, and rewrites the affected flow rules in the CAM (which are identified after the system traverses the per-port chain in operation 608) (operation 632). The switch then removes the linked-list node(s) from a respective per-port chain (operation 634).

If the operation is "modify," the switch modifies the identified flow table entry (operation 614) and checks whether the priority of the flow definition is modified (operation 616). If the priority is modified, the switch re-sorts the corresponding per-port chain(s) based on the priority values of the flow definitions (operation 622). The switch then rewrites the affected rules in the CAM (based on the affected flow IDs identified in operation 608) (operation 624).

In some embodiment, a respective per-port chain is a double linked list. The switch can store a pointer to a flow table entry in a corresponding per-port chain. The switch can obtain the flow definition from a flow table using the flow ID (e.g., hashing the flow ID) and directly delete the flow definition in the flow table entry using the pointer stored in a respective per-port chain. Since a respective per-port chain is double linked list, it is easier to maintain the pointer and delete a flow table entry from the per-port chain while maintaining the sanity of the per-port chain.

Exemplary Switch

Figure 7:
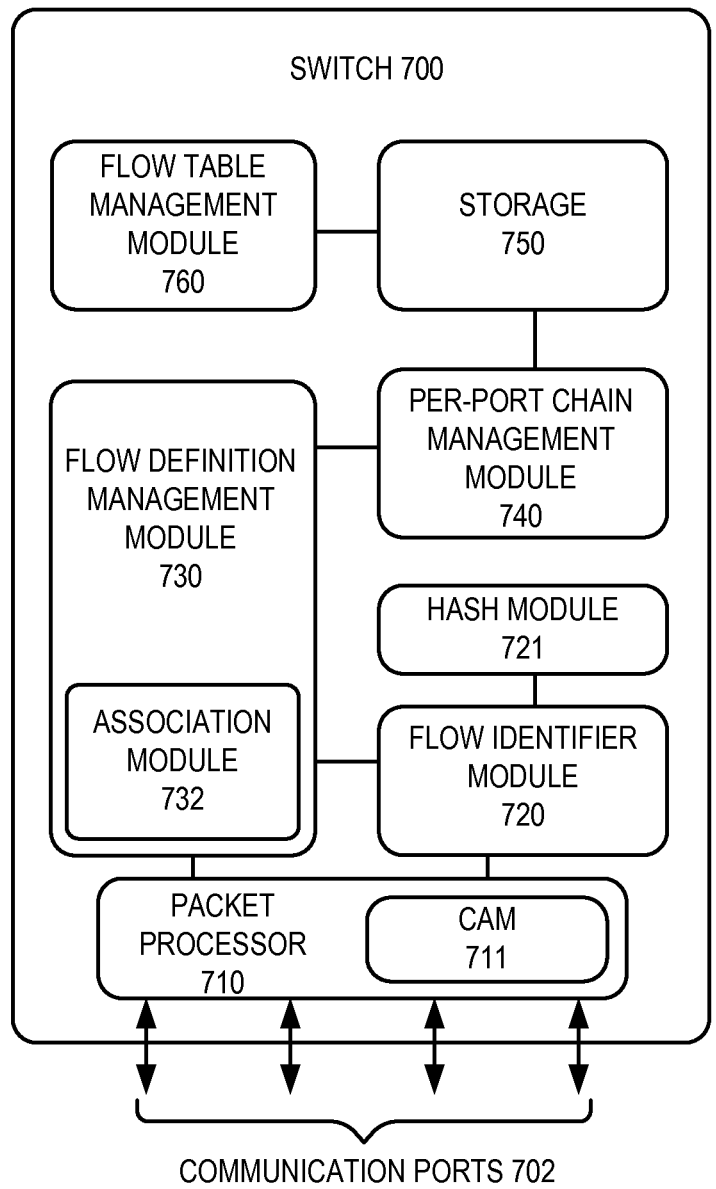
FIG. 7 illustrates an exemplary switch in a software-defined network, in accordance with an embodiment of the present invention.

FIG. 7 illustrates an exemplary switch in a software-defined network, in accordance with an embodiment of the present invention. In this example, a switch 700 includes a number of communication ports 702, a flow definition management module 730, an association module 732, a packet processor 710, and a storage 750. Packet processor 710 further includes a CAM 711. One or more of communication ports 702 are software-definable ports. These software-definable ports can be OpenFlow enabled. Switch 700 receives software-defined data flow via the software-defined flows. During operation, flow definition management module 730 identifies a generic flow definition. This generic flow definition can be a new flow definition received from a controller or already stored in a local flow table. The flow table can reside in storage 750. Association module 732 associates the generic flow definition with a respective software-definable port of switch 700 and creates a new flow definition associated with a respective software-definable port based on the generic flow definition. In some embodiments, association module 732 can store the new flow definitions in the flow table.

In some embodiments, switch 700 includes a flow ID module 720, a hash module 721, a per-port chain management module 740, and a flow table management module 760. During operation, flow ID module 720 generates a flow ID for a flow definition received via one of the communication ports 702. This flow definition can be associated with a software-definable port. Per-port chain management module 740 creates a per-port chain for a respective software-definable port. A node of the per-port chain associated with the software-definable port contains the flow ID. Flow table management module 760 stores the flow definition and the flow ID in an entry in the flow table. Hash module 721 calculates a hash value based on the flow ID and uses the hash value as an index to the entry. Per-port chain management module 740 sorts the per-port chain based on the priority value associated with the flow definition. If the flow definition is modified (e.g., updated or deleted), per-port chain management module 740 precludes flow table management module 760 from sorting the flow definitions which are not associated with the software-definable port.

Upon receiving a frame via the software-definable port, packet processor 710 checks whether the frame received matches with the flow definition. Flow table management module 760 identifies the flow table entry associated with the software-definable port using the flow ID of the flow definition. This flow table can be a hash table and flow table management module 760 can use the flow ID as a hash key to find the flow table entry. If switch 700 is equipped with per-port chain management module 740, when flow definition management module 730 identifies the generic flow definition, per-port chain management module 740 inserts a list node comprising a flow ID of the generic flow into a respective per-port chain in switch 700.

In some embodiments, switch 700 may maintain a membership in a fabric switch. Switch 700 maintains a configuration database in storage 750 that maintains the configuration state of a respective switch within the fabric switch. Switch 700 maintains the state of the fabric switch, which is used to join other switches. Under such a scenario, communication ports 702 can include inter-switch communication channels for communication within a fabric switch. This inter-switch communication channel can be implemented via a regular communication port and based on any open or proprietary format.

Note that the above-mentioned modules can be implemented in hardware as well as in software. In one embodiment, these modules can be embodied in computer-executable instructions stored in a memory which is coupled to one or more processors in switch 700. When executed, these instructions cause the processor(s) to perform the aforementioned functions.

In summary, embodiments of the present invention provide a switch and a method for efficient management of flow definitions in a software-defined network. In one embodiment, the switch includes one or more software-definable ports, a flow definition management module, and an association module. A software-definable port can receive software-defined data flow. During operation, the flow definition management module identifies a generic flow definition of a software-defined network. The generic flow definition is not associated with an incoming port of the switch. The association module associates the generic flow definition with a respective software-definable port of the switch.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
processing circuitry;
one or more switch ports;
a flow definition management apparatus configured to:
identify a generic flow definition which specifies a flow that is not specific to any input switch port of the switch; and
convert the generic flow definition to one or more input-port-specific flow rules, wherein an input-port-specific flow rule corresponds to one of the switch ports of the switch; and
a flow lookup data structure configured to store the one or more input-port-specific flow rules in association with the corresponding switch port, wherein the corresponding switch port supports processing a dataflow based on a flow rule.

2. The switch of claim 1, further comprising a content addressable memory (CAM), wherein the flow lookup data structure is stored in the CAM.

3. The switch of claim 1, wherein the generic flow definition comprises a flag indicating that the generic flow definition is not specific to any input port.

4. The switch of claim 1, wherein the switch is an OpenFlow supported switch.

5. The switch of claim 1, further comprising a per-port linked list for a respective port with support for processing a data flow based on a flow rule;
wherein a node in the linked list indicates a flow identifier for a flow definition applicable to the port; and
wherein the nodes in the linked list are sorted in the order of priority of the corresponding flow definitions.

6. The switch of claim 1, further comprising a flow table configured to store in an entry a flow definition in association with a flow identifier of the flow definition.

7. The switch of claim 6,
wherein the switch further comprises a hash computation apparatus configured to compute a hash value based on the flow identifier of the flow definition; and
wherein the hash value is used as an index to the entry.

8. The switch of claim 1, further comprising a flow definition updating apparatus configured to update a flow definition; and
wherein while updating the flow definition, the flow definition updating apparatus is configured to:
traverse a per-port linked list for a port associated with the flow definition to be updated to locate a flow identifier of the flow definition to be updated;
determine one or more flow identifiers whose priority is lower than the located flow identifier; and
rewrite the flow rules associated with the determined flow identifiers in the flow lookup data structure, thereby preserving the priority order of the flow rules for the port after the update.

9. A method, comprising:
identifying, by a switch, a generic flow definition which specifies a flow that is not specific to any input switch port of the switch, wherein the switch comprises processing circuitry and one or more switch ports; and
converting the generic flow definition to one or more input-port-specific flow rules, wherein an input-port-specific flow rule corresponds to one of the switch ports of the switch; and
storing in a flow lookup data structure the one or more input-port-specific flow rules in association with the corresponding switch port, wherein the corresponding switch port supports processing a data flow based on a flow rule.

10. The method of claim 9, wherein the flow lookup data structure is stored in a content addressable memory (CAM).

11. The method of claim 9, wherein the generic flow definition comprises a flag indicating that the generic flow definition is not specific to any input port.

12. The method of claim 9, wherein the switch is an OpenFlow supported switch.

13. The method of claim 9, further comprising maintaining a per-port linked list for a respective port with support for processing a dataflow based on a flow rule;
wherein a node in the linked list indicates a flow identifier for a flow definition applicable to the port; and
wherein the nodes in the linked list are sorted in the order of priority of the corresponding flow definitions.

14. The method of claim 9, further comprising store in an entry in a flow table a flow definition in association with a flow identifier of the flow definition.

15. The method of claim 14, further comprising computing a hash value based on the flow identifier of the flow definition; and
wherein the hash value is used as an index to the entry.

16. The method of claim 9, further comprising updating a flow definition by:
traversing a per-port linked list for a port associated with the flow definition to be updated to locate a flow identifier of the flow definition to be updated;
determining one or more flow identifiers whose priority is lower than the located flow identifier; and
rewriting the flow rules associated with the determined flow identifiers in the flow lookup data structure, thereby preserving the priority order of the flow rules for the port after the update.

17. A switch means, comprising:
processing circuitry means;
one or more switch port means;
a flow definition management means for:
identifying a generic flow definition which specifies a flow that is not specific to any input port of the switch means; and
converting the generic flow definition to one or more input-port-specific flow rules, wherein an input-port-specific flow rule corresponds to one of the switch port means of the switch means; and
a flow lookup means for storing the one or more input-port-specific flow rules in association with the corresponding port, wherein the corresponding switch port means supports processing a data flow based on a flow rule.

18. The switch means of claim 17, further comprising:
a per-port linked list means for storing flow identifiers of a respective port with support for processing data flows.

19. The switch means of claim 17, wherein the generic flow definition comprises a flag indicating that the generic flow definition is not specific to any input port.

20. The switch means of claim 17, further comprising a flow definition updating means for updating a flow definition.

* * * * *